No. 893,780. PATENTED JULY 21, 1908.
W. M. BUTLER & W. J. BELCHER.
DRIVE CHAIN.
APPLICATION FILED FEB. 8, 1908.
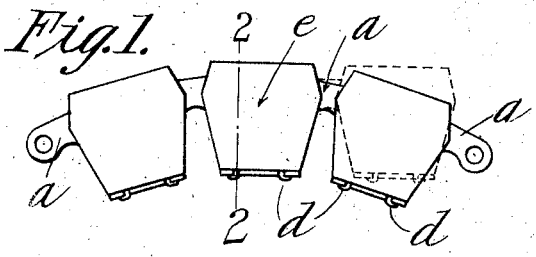
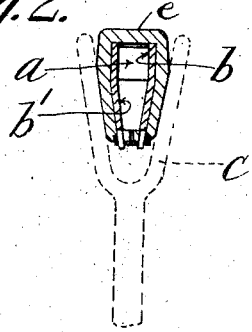
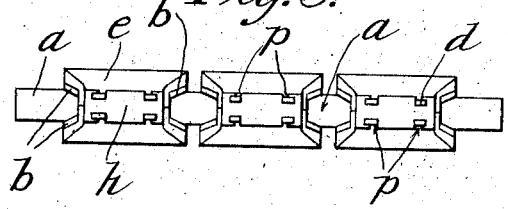
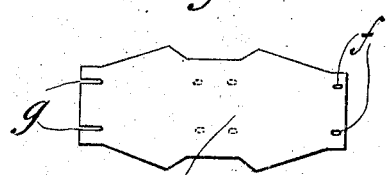
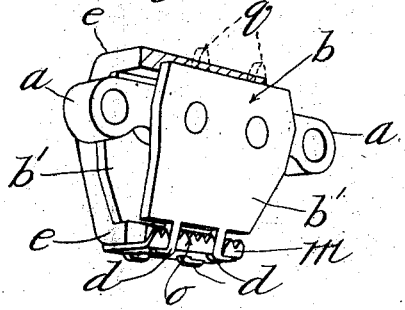
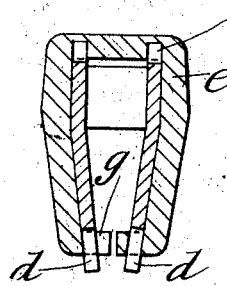
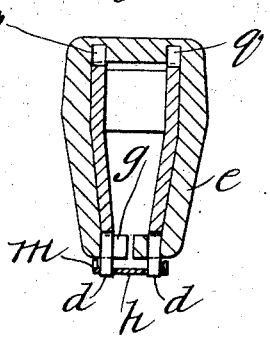
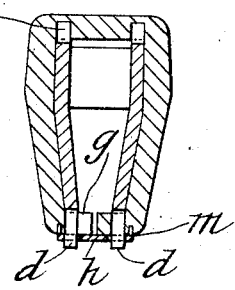
Witnesses:
Inventors,
William M. Butler
Warren J. Belcher
by Chapin & Co.
Attorneys.

UNITED STATES PATENT OFFICE.

WILLIAM M. BUTLER AND WARREN J. BELCHER, OF HARTFORD, CONNECTICUT, ASSIGNORS TO THE WHITNEY MANUFACTURING COMPANY, OF HARTFORD, CONNECTICUT, A CORPORATION.

DRIVE-CHAIN.

No. 893,780.  Specification of Letters Patent.  Patented July 21, 1908.

Application filed February 8, 1908. Serial No. 414,940.

*To all whom it may concern:*

Be it known that we, WILLIAM M. BUTLER and WARREN J. BELCHER, both citizens of the United States of America, residing at Hartford, in the county of Hartford and State of Connecticut, have invented new and useful Improvements in Drive-Chains, of which the following is a specification.

This invention relates to friction drive-chains, the object of the invention being to improve the construction thereof in so far as it relates to the application to the links of a chain of a covering of some suitable material, as leather, to serve as an inclosing casing for said links, said material coming in frictional contact with the sides of a grooved pulley, and constituting the actual driving element for the latter.

The use of an inextensible driving element, as a chain, is a practical necessity in many cases, and also in many cases it is undesirable to use the chain on sprocket-wheels as they are noisy and subject to rapid wear, especially on high speeds. There have, therefore, been many attempts made to drive pulleys by providing chains with some pliable material which will permit their use on grooved pulleys which, in such case, are driven frictionally, but difficulty has been experienced in attaching a frictional covering to the chains in such manner as to prevent them from being torn off, and in such manner as to permit them to run over pulleys of relatively small diameters, which necessitates the application to the links of the chain of a covering material in separate pieces of relatively small size, and in no case wider than the links: Furthermore, it is desirable, in many cases, to provide the friction drive-chain with a smooth exterior surface to permit the application thereto of an idler pulley, especially when the chain is run vertically.

This invention consists therefore in the provision of devices whereby relatively small covering strips of leather, or some like material, may be applied to single links of a chain and securely fastened thereto in such manner as will prevent the strips from tearing out at the point of their attachment to the links, and whereby the covering strips may also be quickly and cheaply applied and secured, this latter characteristic being of the greatest importance commercially, for while many devices heretofore employed may make a desirable fastening, as far as strength is concerned, they involve such an expenditure of labor in their application to a chain as to render the cost thereof prohibitive.

The invention is clearly illustrated in the accompanying drawings, in which,—

Figure 1 is a side elevation of several links of a drive-chain having the invention applied thereto. Fig. 2 is a sectional view of the chain shown in Fig. 1 in the plane of the line 2—2 on said figure, a portion of a grooved pulley being shown in dotted lines to show the relation of the fastening devices to the bottom of the groove in the pulley. Fig. 3 is a plan view of the underside of the chain showing the manner of applying the fastening devices to the covering material. Fig. 4 is a plan view of one of the covering pieces of leather, which encircles the links of the chain. Fig. 5 is a perspective view, somewhat enlarged, of a portion of a chain showing the covering material partly in section. Figs. 6, 7, and 8 are cross-sectional views of a chain showing the successive steps to be followed in applying the covering strips to the chain-links and in securing them thereon.

Referring now to these drawings, the chain is made up of alternate blocks $a$ and side-plates or links $b$, the latter being riveted to the blocks in the usual manner, but unlike the usual construction the side plates $b$ are extended beyond the lower or inner edge of the blocks, as indicated by $b^1$, these extensions being inclined one towards the other as shown in Figs. 2 and 5 clearly, the angle of inclination being the same as that of the sides of the groove of the driving pulley $c$ against which they bear, as indicated in dotted lines in Fig. 2. The lower edges of these extensions $b^1$ of the side plates $b$ are provided with teeth $d$ adapted to extend through the opposite edges of a piece of flexible frictional material $e$ of a shape shown in Fig. 4, substantially, which completely encircles the chain inclosing the two oppositely located side plates $b$, as shown in Fig. 5, and portions of the contiguous ends of the blocks $a$ located between said side plates.

To facilitate the application of the flexible frictional material $e$, shown in Fig. 4, one of the ends of said strip has holes $f$ punched therein for the reception of the teeth $d$ on the inner edge of one of the side plates $b$ of the chain, the opposite end of the frictional material being slitted, as at $g$, whereby in applying the material to the chain that end provided with the holes $f$ may be first attached by forcing it down over the teeth $d$ so that the latter will protrude therethrough, as shown in Fig. 6, the material $e$ being then folded tightly over the upper end of the side plates $b$ as shown in Fig. 6, the teeth $d$ of the opposite side plate entering the slits $g$ in the frictional material. In this way one end of the frictional material $e$ is held by the teeth on one side plate extending through the holes $f$ while the strip is drawn over the top of the plates in close contact with all parts thereof, and the other end of the material having the slits $g$ therein is bent inward to bring this end of the frictional material into close, or substantially abutting, relation to the opposite end thereof. While this end is thus held in a suitable device made for that purpose the locking-plate $h$ is applied in such manner that the ends of the teeth $d$ extend through openings therein whereupon, by means of a suitable tool, the teeth on each side plate are clenched over the locking plate $h$ whereby the two ends of the flexible frictional material $e$ are firmly secured together by the plate. The steps just described are illustrated clearly in Figs. 6, 7, and 8 of the drawings,—Fig. 6 showing the material just wrapped around the plates, Fig. 7 showing the locking-plate $h$ applied thereto, and Fig. 8 showing the teeth $d$ clenched over the locking-plate. This, in a general way, is the description of the fastening device for the two ends of the flexible frictional material $e$ and the manner of its application thereto.

Specifically, the locking plate $h$ (of thin sheet steel, preferably,) has the two opposite borders thereof which are parallel with the side plates, turned up substantially at right angles to the body thereof, these bent up portions being indicated by $m$ (see Figs. 5, 7, and 8) and the edges thereof being serrated or toothed, as at $o$, Fig. 5, the height of these serrated borders $m$ being somewhat less, preferably, than the thickness of the frictional material $e$.

The borders of the locking plates $h$ are perforated, as at $p$ Fig. 3, to receive the teeth $d$, and, as shown in the drawings, these perforations are preferably in the nature of slits extending from the borders inwardly towards the center of the plate, as when they are made in this way they are far more easily and quickly placed in position after the covering material $e$ has been applied to the links, as in Fig. 6.

Fig. 7 shows the position of the locking plate $h$ relative to the inturned ends of the covering material $e$ after the locking plate has been applied thereto, and in this position a suitable tool is forced against the locking plate to sink the serrated borders of the latter into the flexible material and simultaneously turn over and print the teeth $d$ on the side plates, this tool being so constructed, preferably, as to turn the teeth at each end of the side plates $b$ in opposite directions. In this manner, (assuming, as is the case in practice, that the covering material is securely clamped to the side plates when the parts are in the position shown in Fig. 7,) the setting of the locking plate $h$ into the contiguous ends of this covering material, as described, insures the fastening of said material to the plate while the material is tightly drawn over the latter; thus when the operation is completed, the result is a smoothly finished article of very neat appearance, of exceedingly strong and durable construction, inasmuch as the underside of the chain is not intended to come in contact with the bottom of the groove of the driving-pulley $c$. And aside from this constrictive advantage, the application of the covering material to the chain may be effected so quickly as to make this form of drive-chain a commercial possibility from the point of view of the manufacturer.

If desired, a short tooth or teeth may be formed on the upper edge of the side plates $b$, as shown in dotted lines at $q$, Fig. 5, and in the sectional views Figs. 6, 7, and 8, these teeth of course being made of such length as not to extend through the flexible frictional material as it is desirable to keep the outer surface of the chain smooth and free from all obstructions to the end that an idler pulley may be applied to this surface of the chain, if desired, to take up any slack therein.

While the locking plate $h$ has been specifically described herein, as substantially rectangular in form with two opposite sides thereof bent up and provided with serrated edges to be embedded in the covering material, any similar device having the same characteristics would fall entirely within the scope of the invention for the purpose described. Furthermore, while the covering material $e$, as described herein, provided with holes $f$ on one end and the slits $g$ on the other, is desirable from many points of view, it may be made, if desired, with slits on both ends thereof.

What we claim, is:—

1. A friction-drive chain comprising pivotally connected elements, a flexible covering strip extending transversely around each alternate element, and a fastening device to engage the abutting ends of each strip to tightly secure the covering strip to the inclosed chain element to prevent the latter from slipping.

2. A friction-drive chain comprising pivotally connected blocks and side-plates, a covering strip extending transversely around each set of side-plates, and a fastening device to engage the abutting ends of each strip, one edge of the side-plates constituting a part of said fastening device.

3. A friction-drive chain comprising pivotally connected blocks and side-plates, a covering strip of flexible material extending transversely around each set of the side-plates, and a fastening device consisting of a metal plate having serrated edges to engage the abutting ends of the covering strip; the side-plates being provided with means to secure the fastening device in operative position.

4. A friction-drive chain comprising pivotally connected elements, a flexible strip extending transversely around each alternate element, and a fastening device to engage the abutting ends of each strip, said device consisting of a metal plate having toothed edges, one part of the elements inclosed by one of said strips extending through the strip and engaging the metal plate whereby the toothed edge of the plate may be embedded in the covering material.

WILLIAM M. BUTLER.
    WARREN J. BELCHER.

Witnesses:
 C. S. WOODWARD,
 JAS. W. GREEN.